(12) United States Patent
Rocchi et al.

(10) Patent No.: US 9,394,946 B2
(45) Date of Patent: Jul. 19, 2016

(54) VENTILATED AERODYNAMIC FOIL BEARING

(71) Applicant: LIEBHERR-AEROSPACE TOULOUSE SAS, Toulouse (FR)

(72) Inventors: Jerome Rocchi, Roqueseriere (FR); Gregory Grau, Castelmayran (FR); Jerome Aury, Gaillac (FR)

(73) Assignee: LIEBHERR-AEROSPACE TOULOUSE SAS, Toulouse (FR)

( * ) Notice: Subject to any disclaimer, the term of this patent is extended or adjusted under 35 U.S.C. 154(b) by 0 days.

(21) Appl. No.: 14/765,951

(22) PCT Filed: Feb. 4, 2014

(86) PCT No.: PCT/FR2014/050195
§ 371 (c)(1),
(2) Date: Aug. 5, 2015

(87) PCT Pub. No.: WO2014/122388
PCT Pub. Date: Aug. 14, 2014

(65) Prior Publication Data
US 2015/0369294 A1 Dec. 24, 2015

(30) Foreign Application Priority Data
Feb. 6, 2013 (FR) ...................................... 13 51022

(51) Int. Cl.
*F16C 32/06* (2006.01)
*F16C 37/00* (2006.01)
*F16C 17/02* (2006.01)
*F16C 17/04* (2006.01)

(52) U.S. Cl.
CPC ............. *F16C 37/002* (2013.01); *F16C 17/024* (2013.01); *F16C 17/042* (2013.01); *F16C 2326/43* (2013.01); *F16C 2360/23* (2013.01); *F16C 2362/52* (2013.01)

(58) Field of Classification Search
CPC ............................. F16C 17/024; F16C 17/042
USPC ........................................ 384/103, 105, 106
See application file for complete search history.

(56) References Cited

U.S. PATENT DOCUMENTS 4,597,677 A * 7/1986 Hagiwara ............. F16C 17/042
384/105
4,621,930 A 11/1986 Gu et al.
(Continued)

FOREIGN PATENT DOCUMENTS

EP 2 463 536 A1 6/2012
KR 2003029231 A * 4/2003 .............. F04D 29/04

OTHER PUBLICATIONS

International Search Report, dated Apr. 11, 2014, from corresponding PCT application.

*Primary Examiner* — Phillip A Johnson
(74) *Attorney, Agent, or Firm* — Young & Thompson

(57) ABSTRACT

The aerodynamic foil bearing in the form of a radial or axial thrust bearing, includes a rotor and a stator including a support designed to support, facing the rotor, a lift device including: a plurality of evenly distributed elastic foils fixed by a fixing edge to a surface of the lift device facing the rotor; rows of ventilation orifices passing through the lift device and opening between a free edge of each elastic foil and the fixing edge of the next foil, wherein the support includes a cavity having grooves extending under the rows of ventilation orifices and at least one circular groove intersecting the grooves and supplied with a stream of pressurized cooling gas to distribute same so as to cool the underside of each foil and provide a supply of fresh gas above the next foil to compensate for gas losses at the ends of the bearing.

20 Claims, 2 Drawing Sheets

(56) References Cited

U.S. PATENT DOCUMENTS

| | | | | |
|---|---|---|---|---|
| 4,701,060 A | * | 10/1987 | Gu | F16C 37/002 |
| | | | | 384/106 |
| 5,248,205 A | * | 9/1993 | Gu | F16C 17/042 |
| | | | | 384/106 |
| 5,885,004 A | | 3/1999 | Scharrer et al. | |
| 7,056,025 B2 | * | 6/2006 | Nakata | F16C 37/002 |
| | | | | 384/103 |
| 2005/0013515 A1 | | 1/2005 | Nakata | |
| 2011/0120376 A1 | * | 5/2011 | Yang | C23C 16/4585 |
| | | | | 118/723 MW |
| 2012/0207414 A1 | * | 8/2012 | Kim | F16C 17/042 |
| | | | | 384/105 |

* cited by examiner

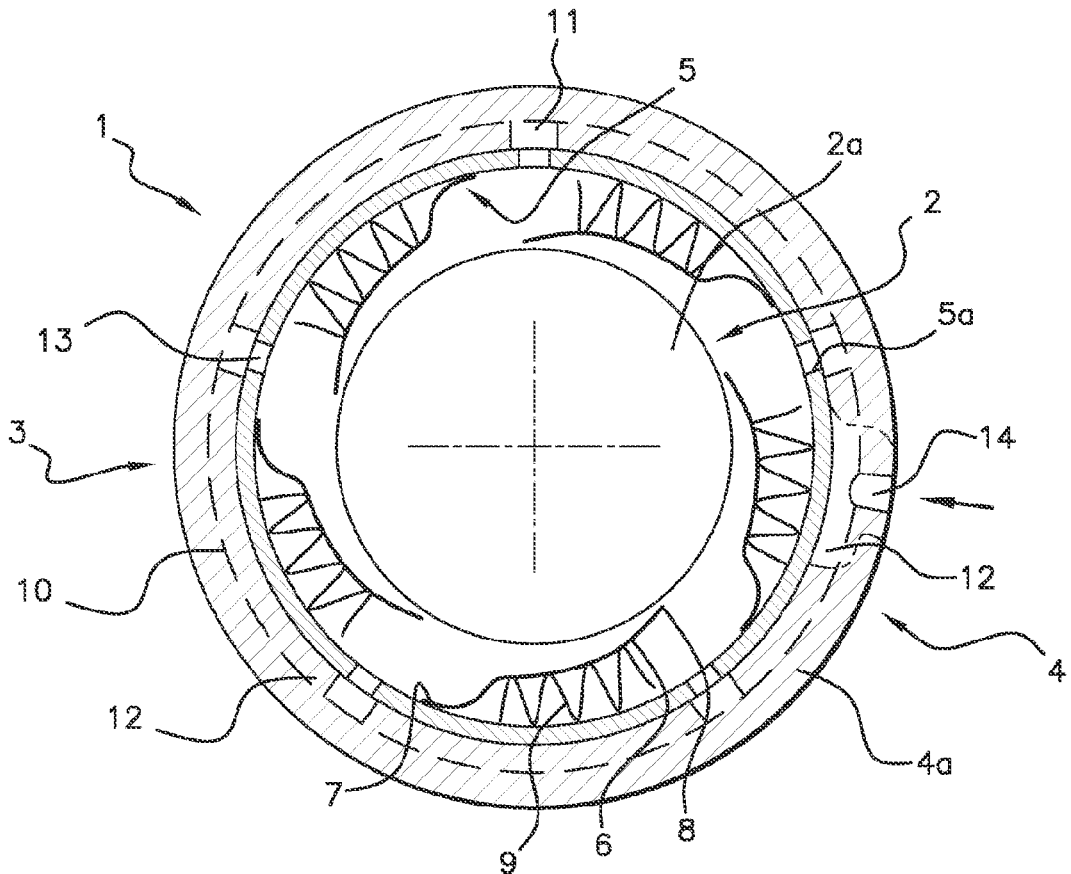
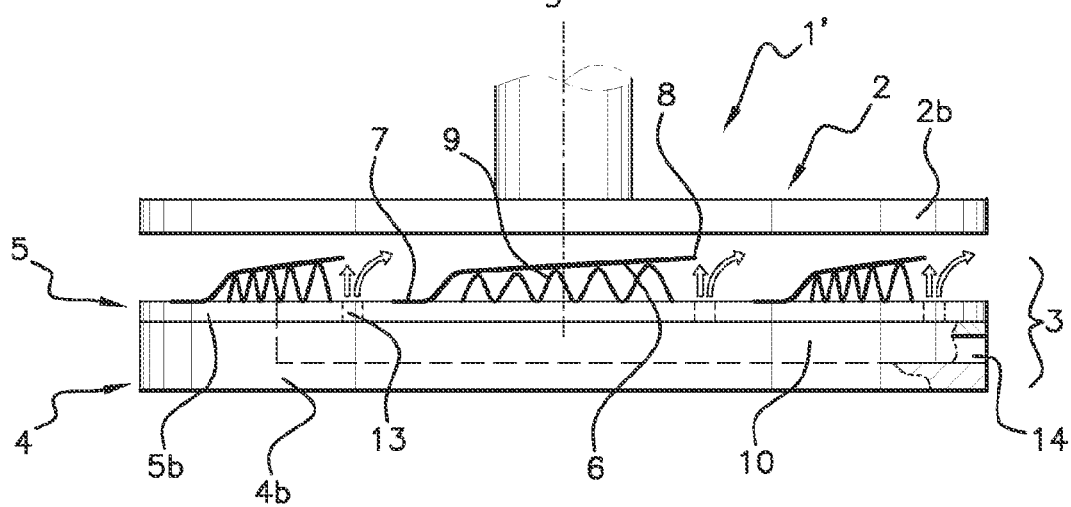

VENTILATED AERODYNAMIC FOIL BEARING

The invention relates to an aerodynamic foil bearing, whether it is a radial bearing or an axial thrust bearing, comprising means for ventilating and/or cooling foils allowing a fluid lift film to be created between a fixed part and a part that is rotationally mobile relative to said fixed part.

Throughout this document, the term "aerodynamic bearing" refers to a radial bearing or to a thrust bearing allowing one part to rotate relative to another part on a fluid film, in particular a gas and more specifically air. Such bearings are generally used for extremely high rotation speeds and relatively weak axial or radial loads compared to the loads supported by other types of bearings (such as ball or hydrodynamic bearings, for example). Furthermore, throughout this document, the terms "front", "rear" and their derivatives (anterior, posterior, preceding, next, etc.) are used with reference to the direction of rotation of the bearing.

Such bearings are generally made up of a fixed part, onto which resilient blades or foils are fixed via a "front" edge, which is oriented orthogonally to the direction of rotation and for which the opposite (rear) edge extends, in the direction of rotation, towards the movable part so as to produce an "air pocket" to provide the lift for the movable part.

Such bearings are used, for example, in the ventilation turbines and compressors of aircraft air conditioning systems. However, these devices have recently evolved so that they are driven by electric motors. This evolution generates new stresses on the bearings that are used in these devices. For example, having a high-power electric motor represents a heat source that increases the temperature of the air used in the bearings. Similarly, the absence or the reduction of the diameter of the drive turbines no longer allows fresh ventilation or cooling air to be provided for these devices and causes an increase in the axial load on the thrust bearings, which increases the temperature of the air film.

Furthermore, in order to facilitate start-up and to reduce the wear of the considered thrust bearings and bearings, the foils forming the pads onto which the air film rests are normally coated with a high lubricating power coating, such as a laminated or graphite fluorocarbon and fluoropolymer coating. These coatings have operating temperature limits that must be respected, which is increasingly difficult with the increase in the temperature of the air films inside the bearings.

A foil thrust bearing is known from the document U.S. Pat. No. 4,621,930, comprising a rotor that is rotationally mobile about an axis and a fixed part formed by a support disc, onto which a disc is fixed that bears resilient foils of substantially trapezoidal shape, each covering a circular sector, evenly distributed over the periphery of the disc. A resilient flange, made up of a series of platelets alternated in the axial direction, is inserted between the support disc and the disc bearing the resilient foils in order to support and provide an axial preload for the disc bearing the resilient foils. Rows of cooling holes are produced in a radial manner in the disc bearing the resilient foils, under the trailing edge thereof.

However, in such a thrust bearing, the cooling air passing through the cooling holes is drawn under the disc bearing the resilient foils under the effect of the negative pressure caused by radial leaks between the rotor and the resilient foils. The air ejected by the radial leaks is then drawn in again above the support disc and thus circulates in a closed circuit. For this reason, the temperature of this air circulating in a closed circuit increases and can exceed the operating temperature limits of the coatings.

The object of the present invention is to propose a foil bearing, wherein the temperature of the air film can be controlled in order to limit the increase in temperature inside the bearing.

A further object of the invention is to propose a foil bearing that allows the heat to be discharged that results from the shearing of the gas film between the free end of the foils and the disc of the rotor.

A further object of the invention is to propose a foil bearing, wherein lateral gas leaks are compensated.

A further object of the invention is to propose a foil bearing with an improved load capacity.

To this end, the invention relates to an aerodynamic foil bearing, comprising a part, the rotor, that is rotationally mobile about an axis, and a fixed part, the stator, said stator comprising a first structure, the support, adapted to support, facing said rotor, a second structure, the lift device, said lift device comprising:
  a plurality of evenly distributed resilient foils, extending over a circular sector and fixed via an edge, the fixing edge, on a surface of the lift device facing the rotor;
  rows of holes, the ventilation holes, passing through the lift device from the face facing the support up to the face bearing the resilient foils, the ventilation holes substantially emerging between an edge, the trailing edge, of each resilient foil opposite the fixing edge thereof and the fixing edge of the next foil,
  wherein the support comprises a cavity having grooves extending under the rows of ventilation holes and at least one circular groove intersecting said grooves, said circular groove being adapted to be supplied with a flow of pressurized cooling gas and to distribute said gas in order to balance the gas pressure inside said grooves in order to cool the inner face of each foil and to provide a supply of fresh gas above the next foil in order to compensate for gas losses at the ends of the bearing.

By providing grooves under and parallel to the rows of ventilation holes, which holes are parallel to the trailing edges of the resilient foils, the cooling gas is supplied over the entire width of the resilient foils and the ventilation holes can have a smaller diameter in order to reduce fresh gas consumption. By connecting each of these supply grooves of the ventilation holes via at least one circular groove for distributing the gas, the gas flow is evenly distributed between all of the resilient foils. Furthermore, by providing this supply of fresh gas in the gas film extending between the free ends of the resilient foils and the rotor, this gas film maintains a moderated temperature, which promotes the lift of the rotor and limits overheating of the trailing edge of the resilient foils under the effect of gas shearing, thus allowing an anti-friction coating to be used thereon. In this way, the rotor itself is cooled by the flow of cooling gas and any local deformations thereof are limited, allowing the stability of the bearing to be improved. Furthermore, the pressure and the amount of fresh gas that is injected are much lower than would be necessary in an aerostatic bearing, in which the static pressure of the injected air creates the lift. Consequently, the means for generating the flow of cooling gas are smaller and lighter and consume less energy. For example, using such a bearing in a 60 to 80 mm diameter electrically driven air compressor consumes only 5 g to 20 g of air per second, taken at the output of the compressor, whereas a similar bearing cooled by a circulation of false air (air leak) consumes at least two times as much and an aerostatic compressor consumes 100 times as much.

Advantageously and according to the invention, the bearing is a radial bearing, the rotor being formed by a rotary shaft, the stator comprising a support and a lift device in the form of concentric rings, the cavity of the support comprising axial grooves. In such a bearing, which allows the rotary shaft to be rotationally guided whilst inducing less friction, the arrangement of the rows of ventilation holes and of their associated supply groove parallel to the axis of rotation of the bearing allows the cooling gas to be uniformly supplied over the entire width of the bearing. The circular groove then forms a cylinder in the stator that is concentric to the axis of the bearing.

Advantageously and according to the invention, the resilient foils are of rectangular shape, with their fixing edge fixed on an inner face of the lift device along a generating line thereof, each foil extending in the direction of rotation of the rotor up to its trailing edge. The resilient foils are preferably welded onto the lift device via their fixing edge, but can also be fixed by bonding, riveting or crimping in a trough, etc.

Advantageously and according to the invention, the bearing is a thrust bearing, the rotor being formed by a rotatable cylindrical plate, coaxially fixed to a shaft about or at the end of said shaft, the stator comprising a support and a lift device in the form of fixed cylindrical plates, coaxial to each other and to said rotor, positioned facing said rotor. Such a bearing can absorb the axial forces produced by the compressor borne by the rotor. In this embodiment, the cavity of the support comprises radial grooves, distributed in order to correspond to the rows of ventilation holes of the lift device, and at least one circular groove intersecting the radial grooves in order to balance the gas pressure inside said grooves. The flow of cooling gas is thus evenly distributed over each resilient foil, along the length of the fixed edge of said foil.

Advantageously and according to the invention, the resilient foils are of substantially trapezoidal shape, with their fixing edge being fixed on a face of the lift device facing the rotor along a radius of the lift device, each foil extending in the direction of rotation of the rotor up to its trailing edge. Preferably, the resilient foils are designed to each cover a circular sector of the lift disc and are disposed at regular intervals in order to cover the disc without overlapping, or with minimum overlapping, of the sectors between them.

Advantageously and according to the invention, each resilient foil is individually in abutment against a stiffener between its fixing edge and its trailing edge. Thus, deformation of the resilient foils is minimized when the rotor does not rotate and rests in abutment against the foils. The same applies during variations in the axial load exerted on the rotor when it is rotating.

Advantageously and according to the invention, the stiffener is formed by a corrugated strip, the corrugations of which are substantially parallel to the fixing edge of each resilient foil. This embodiment of the stiffener allows a spring effect to be provided under the resilient foils allowing variations in the axial load to be absorbed.

Advantageously and according to the invention, the resilient foils are coated with an anti-friction material. Thus, the starting-up and the lifting of the rotor are facilitated and wear of the resilient foils is minimized.

The invention further relates to a foil bearing, characterized in combination by all or part of the features mentioned above or hereafter.

Further objects, features and advantages of the invention will become apparent upon reading the following description and with reference to the appended drawings, wherein:

FIG. 1 is a transverse section view of a radial foil bearing according to the invention;

FIG. 2 is a side view diagram of a thrust bearing according to the invention;

Figure 3:
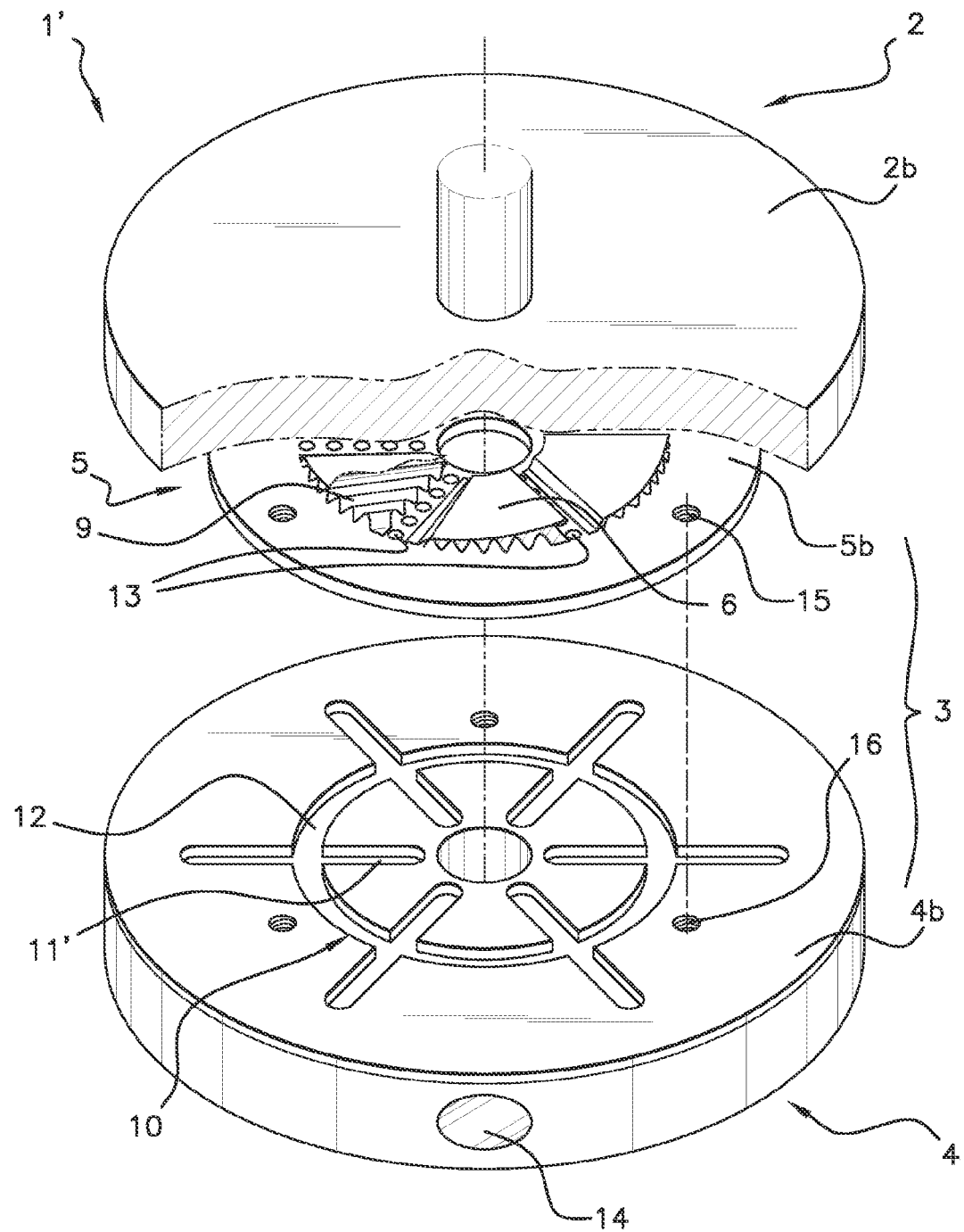
FIG. 3 is an exploded perspective view of a thrust bearing according to the invention.

The bearing 1, which is shown in the form of a radial bearing in FIG. 1, comprises a rotor 2 in the form of a cylindrical shaft and a stator 3 comprising a support 4 in the form of an outer sleeve 4a and a lift device 5 in the form of a ring 5a coaxial to the sleeve 4a and mounted therein. The outer diameter of the ring 5a of the lift device 5 is adjusted to fit the inner diameter of the sleeve 4a. Tightening the adjustment and/or fixing means (not shown) mutually immobilizes the sleeve and the ring in a predetermined position.

The lift device 5 further comprises a plurality of resilient foils 6, of substantially rectangular shape, evenly distributed inside the ring 5a. Each foil 6 is fixed to the inner surface of the ring 5a via its fixing edge 7, extending parallel to the axis of the ring along a generating line of this surface. The fixing edge 7 is rigidly connected to the ring 5a of the lift device by means that are per se known such as welding, riveting, crimping in a slot, etc.

The opposite edge, the trailing edge 8, of the foil 6 extends rearwards, in the direction of rotation, and radially, towards the rotor 2, so as to produce an "air pocket" for providing lift for said rotor on a gas film. Preferably, the trailing edge 8 of each foil 6 substantially extends over the fixing edge 7 of the next foil so that the sum of the angular sectors covered by the foils 6 is approximately equal to 360 degrees in order to cover the entire internal circumference of the bearing.

In order to support and approximately align the shaft when it is not rotating and to limit the deflection of the foils 6, for example during variations in the radial load during operation, said foils are supported by a stiffener 9 formed by a corrugated, preferably metal, strip, the width of which is substantially equal to the length of the foils 6 and for which the axis of the corrugations is substantially parallel to the fixing edge 7 of the foil 6. The stiffener 9 is fixed under the foil 6, on the inner face of the ring 5a, at least via the front edge of its first corrugation so as to allow the resilient deformation of the stiffener 9.

In front of the fixing edge 7 of each foil 6, the ring 5a of the lift device 5 is perforated with a row of ventilation holes 13 along a generating line of the cylinder. The sleeve 4a of the support 4 comprises, on its face that is in contact with the ring 5a, a cavity 10 comprising axial grooves 11 facing rows of holes 13. Preferably, these axial grooves 11 do not emerge at the ends of the sleeve 4a. The axial grooves are connected together by at least one circular groove 12, into which a gas inlet 14 emerges.

During operation, the shaft 2a rotates relative to the stator 3 and thus to the foils 6. The air film entrained by the rotation of the shaft is compressed in the space between the foil and the shaft (the converging section) and forms a pressure field allowing the shaft to be lifted several microns away from the foils 6. Ventilation air is injected through the gas inlet 14 in the circular groove 12 and is distributed in the axial grooves 11. The ventilation air is then injected through the holes 13 between the trailing edge 8 of a foil and the fixing edge 7 of the next foil and at least partially sweeps the inner face of the trailing edge 8 of the foils 6. The fresh ventilation air is thus also injected upstream of the fixing edge 7 of the next foil before being entrained over said foil, where it mixes with the air film in order to cool said film before being compressed in the converging section. The ventilation air thus, more particularly, allows the trailing edge 8 of the foil to be cooled, under which it is injected through the holes 13, this trailing edge being the maximum heating point of the bearing. Furthermore, the increase in the amount of compressed air in the converging section consequently increases the pressure field and thus the bearing capacity of the shaft, thus improving the radial load capacity of the bearing. Furthermore, the ventilation air that is mixed with the ambient air of the bearing allows the temperature of said bearing to be reduced and the amount of air that escapes through the ends of the bearing to be replaced.

The same principle can also be applied to an axial thrust bearing as shown in FIGS. 2 and 3. The axial thrust bearing, named for the sake of clarity the thrust bearing 1', further comprises a rotor 2 comprising a cylindrical plate 2b rigidly connected to a rotary shaft. The thrust bearing 1' further comprises a stator 3 comprising a support 4 in the form of a support disc 4b and a lift device 5 comprising a disc 5b. The cylindrical plate 2b, the support disc 4b and the lift device disc 5b are coaxial and have the axis of rotation of the thrust bearing as a shared axis. The lift device disc 5b is fixed on the support disc 4b in a predetermined angular position by means of screws (not shown) through fixing holes 15 and 16, respectively provided in the lift device disc and the support disc.

The lift device disc 5b further comprises, on its face facing the plate 2b of the rotor, a plurality of resilient foils 6 of substantially trapezoidal shape, evenly distributed over the lift device disc in order to each cover an angular sector centered on the axis of rotation of the thrust bearing. The foils 6 are fixed on the disc 5b via a fixing edge 7 in a radial direction, orthogonal to the direction of rotation of the thrust bearing and extend rearwards, in the direction of rotation up to a trailing edge 8 substantially parallel to the radial direction. In the axial direction, the foils 6 comprise a steep ramp extending from the fixing edge 7 towards the rotor 2, followed by a shallower pitch climbing towards the rotor, even substantially parallel thereto. Each foil 6 thus defines, between its fixing edge 7 and its trailing edge 8, a converging section, in which the air film that exists between the foil 6 and the plate 2b of the rotor is compressed.

The foils 6 are individually in abutment, via their face facing the lift device disc 5b, against a stiffener 9 that is formed, in a similar manner to the stiffener of FIG. 1, by a corrugated, preferably metal, strip, the width of which corresponds to the width of the foil 6. The axis of the corrugations of the stiffener 9 is substantially parallel to the fixing edge 7 of the foil 6. The stiffener 9 itself is also fixed on the lift device disc 5b, under the resilient foil 6, at least via the front edge of its first corrugation in order to allow resilient deformation of the stiffener in the axial direction.

In front of each fixing edge 7 of the foils 6, and under the trailing edge of the preceding foil 6, the lift device disc 5b is perforated with a row of ventilation holes 13 extending radially parallel to the fixing edge 7.

Below the lift device disc 5b, the face facing the support disc 4b is hollowed out with a cavity 10, into which a gas inlet 14 emerges allowing the cavity 10 to be supplied with ventilation air at a pressure that is above atmospheric pressure. The cavity 10 comprises a plurality of radial grooves 11' extending below and facing rows of ventilation holes 13 and at least one circular groove 12 connecting the radial grooves 11' in order to uniformly distribute the ventilation air between these grooves.

When idle, when the rotor is immobile, the cylindrical plate 2b is in abutment against the foils 6, which foils are supported by the stiffeners 9. When the rotor is set into rotation, the plate 2b rubs (dry friction) against the foils 6. In order to limit the setting into rotation torque, these foils advantageously are coated with an anti-friction coating, with a high lubricating power, such as a laminated fluorocarbon coating, for example.

During operation, the cylindrical plate 2b rotates relative to the stator 3 and therefore relative to the foils 6. The air film entrained by the rotation of the plate is compressed in the converging section between the foil and the plate 2b and forms a pressure field allowing the plate to be lifted several microns away from the foils 6.

In order to limit heating up the coating of the foils 6, the ventilation air is injected through the gas inlet 14 in the circular groove 12 and is distributed in the radial grooves 11'. The ventilation air thus passes through the ventilation holes 13 and sweeps the inner face of the trailing edge 8 of the foils 6 before being entrained over the next foil, where it mixes with the air film in order to be compressed in the converging section. The ventilation air thus, more particularly, cools the trailing edge 8 of the foil, under which it is injected through the holes 13, this trailing edge being the maximum heating point of the bearing. Furthermore, the increase in the amount of compressed air in the converging section consequently increases the pressure field and therefore the bearing capacity of the rotor, thus improving the axial load capacity of the bearing. Furthermore, the ventilation air mixed with the ambient air of the bearing allows the temperature of said bearing to be reduced and allows the quantity of air that radially escapes under the effect of the centrifugal force to be replaced. It has also been noted that the ventilation air also sweeps the plate 2b of the rotor 2 and cools said plate, thus allowing any thermal deformations to be limited that could adversely affect the evenness of the thickness of the air film and thus limit the axial load capacity of the thrust bearing 1'.

Of course, this description is provided solely by way of example and a person skilled in the art could make numerous modifications thereto without deviating from the scope of the invention, such as, for example, by varying the number and the angular width of the resilient foils 6 that form the lift pads in order to form a practically continuous lift surface or, on the contrary, if the radial loads (or axial loads) experienced by these bearings are weak, by providing necessary gaps between the pads in order to improve cooling.

The invention claimed is:

1. Aerodynamic foil bearing (1, 1'), comprising a rotor (2), that is rotationally mobile about an axis, and a fixed stator (3), said stator comprising a support (4), adapted to support, facing said rotor, a lift device (5), said lift device comprising:
   a plurality of evenly distributed resilient foils (6), extending over a circular sector and fixed via a fixing edge (7), on a surface of said lift device facing said rotor;
   rows of ventilation holes (13), passing through said lift device (5) from a face facing said support (4) up to another face bearing said resilient foils, said ventilation holes substantially emerging between a trailing edge (8), of each resilient foil (6) opposite the fixing edge (7) thereof and the fixing edge (7) of the next foil,
   wherein said support (4) comprises a cavity (10) having grooves (11, 11') extending under said rows of ventilation holes (13) and at least one circular groove (12) intersecting said grooves, said circular groove being adapted to be supplied by a flow of pressurized cooling gas and to distribute said gas in order to balance the gas pressure inside said grooves in order to cool an inner face of each foil (6) and to provide a supply of fresh gas above the next foil (6) to compensate for gas losses at the ends of said bearing.

2. The bearing as claimed in claim 1, wherein said bearing (1) is a radial bearing, said rotor (2) being formed by a rotary shaft (2a), said stator (4) comprising the support (4a) and the lift device (5) in the form of concentric rings, said cavity (10) of said support (4a) comprising axial grooves (11).

3. The bearing as claimed in claim 2, wherein said resilient foils (6) are of rectangular shape, with their fixing edge (7) being fixed on an inner face of said lift device (5) along a generating line thereof, each foil extending in the direction of rotation of said rotor (2) up to the trailing edge (8) of said each foil (6).

4. The bearing as claimed in claim 2, wherein each resilient foil (6) is individually in abutment against a stiffener (9) between the fixing edge (7) and the trailing edge (8) of said each foil (6).

5. The bearing as claimed in claim 2 wherein said resilient foils (6) are coated with an anti-friction material.

6. The bearing as claimed in claim 1, wherein said resilient foils (6) are of rectangular shape, with their fixing edge (7) being fixed on an inner face of said lift device (5) along a generating line thereof, each foil extending in the direction of rotation of said rotor (2) up to the trailing edge (8) of said each foil (6).

7. The bearing as claimed in claim 6, wherein each resilient foil (6) is individually in abutment against a stiffener (9) between the fixing edge (7) and the trailing edge (8) of said each foil (6).

8. The bearing as claimed in claim 6 wherein said resilient foils (6) are coated with an anti-friction material.

9. The bearing as claimed in claim 1, wherein said bearing is a thrust bearing (1'), said rotor (2) being formed by a rotatable cylindrical plate (2b), coaxially fixed to a shaft about or at the end of said shaft, said stator (3) comprising the support (4) and the lift device (5) in the form of fixed cylindrical plates (4b, 5b), coaxial to each other and to said rotor, placed facing said rotor, said cavity (10) of said support (4) comprising radial grooves (11').

10. The bearing as claimed in claim 9, wherein said resilient foils (6) are of substantially trapezoidal shape, with their fixing edge (7) being fixed on a face of said lift device (5) facing said rotor in a radius of said lift device, each foil extending in the direction of rotation of said rotor (2) up to the trailing edge (8) of said each foil (6).

11. The bearing as claimed in claim 9, wherein each resilient foil (6) is individually in abutment against a stiffener (9) between the fixing edge (7) and the trailing edge (8) of said each foil (6).

12. The bearing as claimed in claim 9 wherein said resilient foils (6) are coated with an anti-friction material.

13. The bearing as claimed in claim 1, wherein said resilient foils (6) are of substantially trapezoidal shape, with their fixing edge (7) being fixed on a face of said lift device (5) facing said rotor in a radius of said lift device, each foil extending in the direction of rotation of said rotor (2) up to the trailing edge (8) of said each foil (6).

14. The bearing as claimed in claim 13, wherein each resilient foil (6) is individually in abutment against a stiffener (9) between the fixing edge (7) and the trailing edge (8) of said each foil (6).

15. The bearing as claimed in claim 13 wherein said resilient foils (6) are coated with an anti-friction material.

16. The bearing as claimed in claim 1, wherein each resilient foil (6) is individually in abutment against a stiffener (9) between the fixing edge (7) and the trailing edge (8) of said each foil (6).

17. The bearing as claimed in claim 16, wherein said stiffener (9) is formed by a corrugated strip, the corrugations of which are substantially parallel to the fixing edge (7) of each resilient foil (6).

18. The bearing as claimed in claim 17 wherein said resilient foils (6) are coated with an anti-friction material.

19. The bearing as claimed in claim 16 wherein said resilient foils (6) are coated with an anti-friction material.

20. The bearing as claimed in claim 1, wherein said resilient foils (6) are coated with an anti-friction material.

* * * * *